(12) United States Patent
Kevelos et al.

(10) Patent No.: US 8,526,144 B2
(45) Date of Patent: Sep. 3, 2013

(54) RESET LOCKOUT WITH GROUNDED NEUTRAL TEST

(75) Inventors: Adam Kevelos, Coram, NY (US); Michael Ostrovsky, Brooklyn, NY (US); Aleksandr Aronov, Jr., Brooklyn, NY (US)

(73) Assignee: Leviton Manufacturing Company, Inc., Melville, NY (US)

( * ) Notice: Subject to any disclaimer, the term of this patent is extended or adjusted under 35 U.S.C. 154(b) by 202 days.

(21) Appl. No.: 13/077,897

(22) Filed: Mar. 31, 2011

(65) Prior Publication Data

US 2012/0250193 A1 Oct. 4, 2012

(51) Int. Cl.
*H02H 3/00* (2006.01)

(52) U.S. Cl.
USPC .......................................... 361/42

(58) Field of Classification Search
None
See application file for complete search history.

(56) References Cited

U.S. PATENT DOCUMENTS

| | | |
|---|---|---|
| 3,309,571 A | 3/1967 | Gilker |
| 3,538,477 A | 11/1970 | Walters et al. |
| 3,702,418 A | 11/1972 | Obenhaus |
| 3,728,617 A | 4/1973 | Potter |
| 3,731,154 A | 5/1973 | Torosian |
| 3,766,434 A | 10/1973 | Sherman |
| 3,813,579 A | 5/1974 | Doyle et al. |
| 3,864,649 A | 2/1975 | Doyle |
| 3,872,354 A | 3/1975 | Nestor et al. |
| 3,949,336 A | 4/1976 | Dietz |
| 4,002,951 A | 1/1977 | Halbeck |
| 4,034,266 A | 7/1977 | Virani et al. |
| 4,034,360 A | 7/1977 | Schweitzer, Jr. |
| 4,042,967 A | 8/1977 | Yamamoto |
| 4,051,544 A | 9/1977 | Vibert |
| 4,063,299 A | 12/1977 | Munroe |
| 4,086,549 A | 4/1978 | Slater et al. |
| 4,109,226 A | 8/1978 | Bowling et al. |
| 4,114,123 A | 9/1978 | Grenier |
| 4,159,499 A | 6/1979 | Bereskin |
| 4,223,365 A | 9/1980 | Moran |
| 4,237,435 A | 12/1980 | Cooper et al. |
| 4,316,230 A | 2/1982 | Hansen et al. |
| 4,377,837 A | 3/1983 | Matsko et al. |
| 4,386,338 A | 5/1983 | Doyle et al. |

(Continued)

FOREIGN PATENT DOCUMENTS

| AU | 759587 | 4/2003 |
|---|---|---|
| CA | 2425810 | 4/2002 |

(Continued)

*Primary Examiner* — Jared Fureman
*Assistant Examiner* — Terrence Willoughby
(74) *Attorney, Agent, or Firm* — Collard & Roe, P.C.

(57) ABSTRACT

There is a fault circuit interrupter comprising at least one grounded neutral sensor and at least one test circuit configured to test the grounded neutral sensor. A further embodiment can also include at least one fault circuit which is configured to detect a current sent from the grounded neutral sensor. The device can also include a line side phase line, a line side neutral line, and a test line coupled to the line side neutral line and extending from a first region on the line side neutral line to a second region on the line side neutral line, with the grounded neutral sensor being positioned between the first region and the second region on the line side neutral line. This test circuit can comprise a switch, such as a manually operatable switch or it can comprise any one of solid state circuitry, a transistor, and/or a silicon controlled rectifier.

28 Claims, 12 Drawing Sheets

(56) References Cited

U.S. PATENT DOCUMENTS

| | | |
|---|---|---|
| 4,409,574 A | 10/1983 | Misencik et al. |
| 4,412,193 A | 10/1983 | Bienwald et al. |
| 4,442,470 A | 4/1984 | Misencik |
| 4,518,945 A | 5/1985 | Doyle et al. |
| 4,521,824 A | 6/1985 | Morris et al. |
| 4,538,040 A | 8/1985 | Ronemus et al. |
| 4,567,456 A | 1/1986 | Legatti |
| 4,574,260 A | 3/1986 | Franks |
| 4,578,732 A | 3/1986 | Draper et al. |
| 4,587,588 A | 5/1986 | Goldstein |
| 4,595,894 A | 6/1986 | Doyle et al. |
| 4,630,015 A | 12/1986 | Gernhardt et al. |
| 4,631,624 A | 12/1986 | Dvorak et al. |
| 4,719,437 A | 1/1988 | Yun |
| 4,802,052 A | 1/1989 | Brant et al. |
| 4,814,641 A | 3/1989 | Dufresne |
| 4,851,951 A | 7/1989 | Foster, Jr. |
| 4,901,183 A | 2/1990 | Lee |
| 4,967,308 A | 10/1990 | Morse |
| 4,979,070 A | 12/1990 | Bodkin |
| 5,144,516 A | 9/1992 | Sham |
| 5,148,344 A | 9/1992 | Rao et al. |
| 5,185,687 A | 2/1993 | Beihoff et al. |
| 5,202,662 A | 4/1993 | Bienwald et al. |
| 5,223,810 A | 6/1993 | Van Haaren |
| 5,224,006 A | 6/1993 | MacKenzie et al. |
| 5,229,730 A | 7/1993 | Legatti et al. |
| 5,239,438 A | 8/1993 | Echtler |
| 5,347,248 A | 9/1994 | Herbert |
| 5,363,269 A | 11/1994 | McDonald |
| 5,418,678 A | 5/1995 | McDonald |
| 5,448,443 A | 9/1995 | Muelleman |
| 5,477,412 A | 12/1995 | Neiger et al. |
| 5,510,760 A | 4/1996 | Marcou et al. |
| 5,515,218 A | 5/1996 | DeHaven |
| 5,517,165 A | 5/1996 | Cook |
| 5,541,800 A | 7/1996 | Misencik |
| 5,555,150 A | 9/1996 | Newman, Jr. |
| 5,594,398 A | 1/1997 | Marcou et al. |
| 5,600,524 A | 2/1997 | Neiger et al. |
| 5,617,284 A | 4/1997 | Paradise |
| 5,625,285 A | 4/1997 | Virgilio |
| 5,628,394 A | 5/1997 | Benke et al. |
| 5,631,798 A | 5/1997 | Seymour et al. |
| 5,637,000 A | 6/1997 | Osterbrock et al. |
| 5,654,857 A | 8/1997 | Gershen |
| 5,655,648 A | 8/1997 | Rosen et al. |
| 5,661,623 A | 8/1997 | McDonald et al. |
| 5,680,287 A | 10/1997 | Gernhardt et al. |
| 5,694,280 A | 12/1997 | Zhou |
| 5,706,155 A | 1/1998 | Neiger et al. |
| 5,715,125 A | 2/1998 | Neiger et al. |
| 5,719,363 A | 2/1998 | Handler |
| 5,729,417 A | 3/1998 | Neiger et al. |
| 5,805,397 A | 9/1998 | MacKenzie |
| 5,815,363 A | 9/1998 | Chu |
| 5,825,602 A | 10/1998 | Tosaka et al. |
| 5,844,765 A | 12/1998 | Kato et al. |
| 5,847,913 A | 12/1998 | Turner et al. |
| 5,849,878 A | 12/1998 | Cantor et al. |
| 5,875,087 A | 2/1999 | Spencer et al. |
| 5,917,686 A | 6/1999 | Chan et al. |
| 5,933,063 A | 8/1999 | Keung et al. |
| 5,943,198 A | 8/1999 | Hirsh et al. |
| 5,943,199 A | 8/1999 | Aromin |
| 5,956,218 A | 9/1999 | Berthold |
| 5,963,408 A | 10/1999 | Neiger et al. |
| 6,021,034 A | 2/2000 | Chan et al. |
| 6,040,967 A | 3/2000 | DiSalvo |
| 6,052,265 A | 4/2000 | Zaretsky et al. |
| 6,180,899 B1 | 1/2001 | Passow |
| 6,226,161 B1 | 5/2001 | Neiger et al. |
| 6,246,558 B1 | 6/2001 | DiSalvo et al. |
| 6,252,407 B1 | 6/2001 | Gershen |
| 6,282,070 B1 | 8/2001 | Ziegler et al. |
| 6,288,882 B1 | 9/2001 | DiSalvo et al. |
| 6,309,248 B1 | 10/2001 | King |
| 6,324,043 B1 | 11/2001 | Turner |
| 6,381,112 B1 | 4/2002 | DiSalvo |
| 6,381,113 B1 | 4/2002 | Legatti |
| 6,437,700 B1 | 8/2002 | Herzfeld et al. |
| 6,437,953 B2 | 8/2002 | DiSalvo et al. |
| D462,660 S | 9/2002 | Huang et al. |
| 6,558,928 B1 | 5/2003 | Landegren |
| 6,580,344 B2 | 6/2003 | Li |
| 6,590,172 B1 | 7/2003 | Gadre et al. |
| 6,590,753 B1 | 7/2003 | Finlay |
| 6,621,388 B1 | 9/2003 | Macbeth |
| 6,628,486 B1 | 9/2003 | Macbeth |
| 6,646,838 B2 | 11/2003 | Ziegler et al. |
| 6,657,834 B2 | 12/2003 | DiSalvo |
| 6,671,145 B2 | 12/2003 | Germain et al. |
| 6,693,779 B2 | 2/2004 | DiSalvo |
| 6,717,782 B2 | 4/2004 | DiSalvo et al. |
| 6,771,152 B2 | 8/2004 | Germain et al. |
| 6,813,126 B2 | 11/2004 | DiSalvo et al. |
| 6,828,886 B2 | 12/2004 | Germain et al. |
| 6,842,095 B2 | 1/2005 | Macbeth |
| 6,864,766 B2 | 3/2005 | DiSalvo et al. |
| 6,864,769 B2 | 3/2005 | Germain et al. |
| 6,900,972 B1 | 5/2005 | Chan et al. |
| 6,937,451 B2 | 8/2005 | Ulrich et al. |
| 6,944,001 B2 | 9/2005 | Ziegler et al. |
| 6,975,192 B2 | 12/2005 | Disalvo |
| 6,975,492 B2 | 12/2005 | DiSalvo |
| 6,982,856 B2 | 1/2006 | Bernstein |
| 6,998,945 B2 | 2/2006 | Huang et al. |
| 7,031,125 B2 | 4/2006 | Germain et al. |
| 7,042,688 B2 | 5/2006 | Chan et al. |
| 7,049,910 B2 | 5/2006 | Campolo et al. |
| 7,098,761 B2 | 8/2006 | Germain et al. |
| 7,209,330 B2 | 4/2007 | DiSalvo |
| 7,365,621 B2 | 4/2008 | Germain et al. |
| 7,378,927 B2 | 5/2008 | DiSalvo et al. |
| 8,299,799 B2 * | 10/2012 | Finlay et al. ............... 324/424 |
| 2002/0064779 A1 | 5/2002 | Landegren et al. |
| 2002/0135957 A1 | 9/2002 | Chan et al. |
| 2003/0085783 A1 | 5/2003 | Macbeth |
| 2003/0151478 A1 | 8/2003 | Radosavljevic et al. |
| 2005/0012575 A1 | 1/2005 | Huang et al. |
| 2007/0014058 A1 | 1/2007 | Chan et al. |
| 2008/0239596 A1 | 10/2008 | Restrepo et al. |
| 2009/0040667 A1 * | 2/2009 | DiSalvo et al. ............... 361/42 |

FOREIGN PATENT DOCUMENTS

| | | |
|---|---|---|
| EP | 0526071 A | 2/1993 |
| ES | 21345 8/77 | 5/1978 |
| GB | 227930 | 1/1925 |
| GB | 830018 | 3/1960 |
| GB | 2207823 | 2/1989 |
| GB | 2290181 | 12/1995 |
| GB | 2292491 | 2/1996 |
| JP | 61-259428 | 11/1986 |
| WO | WO96/01484 A | 1/1996 |
| WO | PCT/US99/19319 | 3/2000 |
| WO | PCT/US00/22955 | 3/2001 |
| WO | PCT/US01/32562 | 4/2002 |
| WO | WO2004/070751 | 8/2004 |
| WO | WO2004/070752 | 8/2004 |

* cited by examiner

RESET LOCKOUT WITH GROUNDED NEUTRAL TEST

BACKGROUND OF THE INVENTION

The invention relates to a system, device, and/or process for testing grounded neutral protection.

Currently, Underwriters Laboratory (UL) standard 943 requires a fault circuit to have a supervisory circuit. This supervisory circuit can require a test circuit that is used to test that the ground fault circuit interrupter (GFCI) is sensitive enough to detect small differential currents as low as approximately 6 ma. Furthermore, GFCIs are required to have grounded neutral protection. This means that if the output of the GFCI's neutral conductor is grounded the GFCI will detect and trip. A grounded neutral condition is a particularly dangerous condition because a grounded neutral condition provides a current path to ground as well as back through the neutral conductor, which in essence desensitizes the differential transformer from detecting a current imbalance that is potentially hazardous. An example of how a grounded neutral condition is created is when a ground line contacts a neutral line either before or after contacts. This condition is dangerous because the desensitizing of a normal current imbalance detector (differential transformer) may not accurately detect all the current that is present in a circuit. This can cause more current to pass through a person because some of the current is returned through the neutral conductor offsetting the true current passing through a person. Therefore, there is a need for a fault circuit interrupter having grounded neutral protection and a fault circuit interrupter configured to test this grounded neutral protection.

SUMMARY OF THE INVENTION

One embodiment relates to a fault circuit interrupter comprising at least one grounded neutral sensor, and at least one test circuit configured to test the grounded neutral sensor. In at least one embodiment, the grounded neutral sensor is a transformer. In at least one embodiment, the differential sensor is a transformer.

A further embodiment can include at least one fault circuit which is configured to detect a current sent from the grounded neutral sensor. This embodiment can also include a line side and a load side, and a plurality of separatable contacts which can be configured to separate in the presence of a fault. The device can also include a line side phase line, a line side neutral line, and a test line that is coupled to the line side neutral line and extends from a first region on the line side neutral line to a second region on the line side neutral line, with the grounded neutral sensor being positioned between the first region and the second region on the line side neutral line.

This test circuit can comprise a switch, such as a manually operatable switch, or it can comprise any one of solid state circuitry, a transistor, and/or a silicon controlled rectifier (SCR).

The device can also comprise at least one indication circuit, wherein the indication circuit can comprise at least one light and/or audible indicator. This indication circuit can be configured to indicate at least one of the following conditions: a failed test, a successful test, and whether the contacts are latched.

The device also includes a differential sensor and also at least one second test circuit configured to directly test the differential sensor. This test circuit can include a switch configured to selectively pass a current between the phase line, and the neutral line to create a current imbalance between the phase line and the neutral line.

The device can also include a processor such as a microprocessor in communication with any one of the above test circuits, wherein the processor is configured to initiate a self-test. This processor can include at least one clock, wherein the clock is configured to periodically initiate a self-test on the at least one test circuit.

At least one embodiment of the invention can also include a process for testing a fault circuit. This process includes creating a simulated grounded neutral fault, determining whether the simulated grounded neutral fault is correctly detected, and then indicating a result of the test to a user.

BRIEF DESCRIPTION OF THE DRAWINGS

Other objects and features of the present invention will become apparent from the following detailed description considered in connection with the accompanying drawings. It should be understood, however, that the drawings are designed for the purpose of illustration only and not as a definition of the limits of the invention.

In the drawings, wherein similar reference characters denote similar elements throughout the several views.

DETAILED DESCRIPTION OF PREFERRED EMBODIMENTS

Figure 1A:
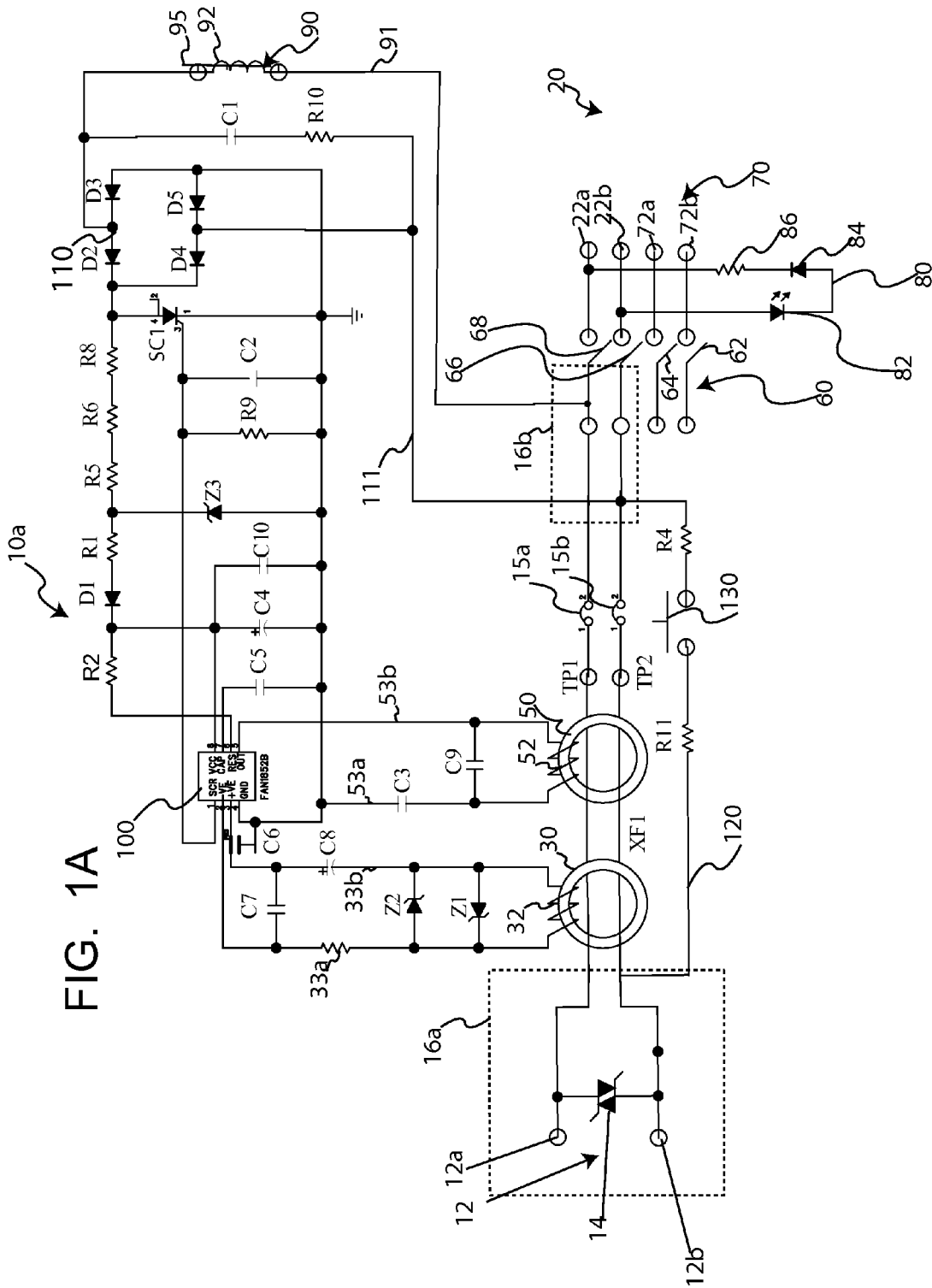
FIG. 1A is a first schematic block diagram of fault circuit interrupter having a test circuit for grounded neutral testing.

Referring in detail to the drawings, FIG. 1A shows a schematic block diagram of a fault circuit interrupter device 10a, having a line side 12 and a load side 20. Line side 12 includes line side phase line 12a, and line side neutral line 12b. In addition, coupled between line side phase line 12a and line side neutral line 12b is a metal oxide varistor (MOV) 14 which is configured to allow for controlled arcing in the event of a power surge or spike. Disposed along line side phase line 12a and line side neutral line 12b are respective shunts 15a and 15b. In addition, disposed along line side phase line 12a is a tap point TP1 and disposed along line side neutral line is tap point TP2. These lines pass through and/or are coupled to differential sensor 30 and grounded neutral sensor 50. In at least one embodiment, the differential sensor 30 is a transformer. In at least one embodiment, the grounded neutral sensor 50 is a transformer. In addition, coupled to line side phase line 12a and line side neutral line 12b are contacts 60 comprising contacts 62, 64, 66, and 68. These contacts 60 can be in the form of separable contacts or bridging contacts which are separable upon activation of an actuator 90.

Load side 20 includes load side phase line 22a and load side neutral line 22b. In addition, face side 70 includes face side phase line 72a and face side neutral line 72b. An indicator circuit 80 is coupled at one end to load side phase line 22a and at another end to neutral side phase line 22b. This indicator circuit 80 includes a LED 82, a diode 84, and a resistor 86 coupled in series. This indicator circuit can be used to indicate that the contacts have been connected, and/or that the contacts are disconnected and that the power is instead coupled directly to the load side.

Both differential sensor 30 and grounded neutral sensor 50 are coupled to fault circuit 100 which can be in the form of an integrated circuit such as a Fairchild FAN1852B. Other integrated circuits can also be used such as a National Instruments LM 1851 integrated circuit as well. Fault circuit 100 includes a total of 8 pins which are configured to receive and/or output signals to control the tripping of contacts 60.

In addition, there are two sets of windings 32, and 52. A first set of windings 32 are coupled to differential sensor 30 and a second set of windings 52 are coupled to grounded neutral sensor 50. Windings 32 extend into lines 33a and 33b which include zener diodes Z1 and Z2 along with capacitor C7 and extend into fault circuit 100. In addition, windings 52 are coupled to lines 53a and 53b which include capacitors C3 and C9, wherein these lines 53a and 53b are configured to extend into fault circuit 100. Fault circuit 100 when powered, passes a signal such as a high frequency signal into windings 52 to create a signal generated by grounded neutral sensor 50. Under normal conditions, when grounded neutral sensor 50 is not coupled to differential sensor 30, differential sensor 30 is blind to the existence of grounded neutral sensor 50. However, when grounded neutral sensor 50 is coupled to differential sensor 30, the signal from grounded neutral sensor 50 passes to differential sensor 30.

Fault circuit 100 can have any suitable design, but in this case has eight pins. Fault circuit 100 is also coupled to additional fault circuitry through these pins. For example, an output of pin 1 of fault circuit 100 is coupled to a switch or silicon controlled rectifier or SCR SC1. Pins 2 and 3 are coupled to winding 32, while pins 4 and 5 are coupled to winding 52. Pin 6 is coupled to a power circuit including a plurality of different resistors R1, R5, R6, and R8. In addition, coupled to these resistors is a bridge 110 which comprises a plurality of diodes D2, D3, D4 and D5. Bridge 110 is coupled to phase input line 12a and neutral input line 12b. In addition, coupled to bridge 110 is a capacitor C1 and a resistor R10 in series along line 111. Thus, bridge 110 provides a rectified power input into fault circuit 100. Fault circuit 100 at pin 7, is coupled to a timing capacitor C5. Fault circuit 100 is also coupled to additional capacitors C2, C4 and 010.

Line 120 is coupled to neutral input line 12b at a first end on one side of sensors 30 and 50 and coupled to an opposite side of sensors 30 and 50 on the opposite side. Line 120 forms a component of a grounded neutral test circuit which is coupled to the line side neutral line 12b. Coupled along line 120 are two resistors R11 and R4. A test control switch 130 is coupled along this line which when pressed, causes grounded neutral sensor 50 to be coupled to differential sensor 30. If the resistance of resistors R4 and R11 are increased, then the differential coil must be more sensitive to the presence of a grounded neutral fault. Essentially, the grounded neutral test circuit comprises any component sufficient to test the grounded neutral circuit, which in this embodiment is at least one of line 120, resistors R4, and R11, as well as test switch 130. The values for resistors R4 and R11 can be selected so as to create different sensitivity values for testing. Thus, when button 130 is pressed, an electrical path is established that passes through differential sensor 30 and grounded neutral sensor 50 and line 120. Essentially, grounded neutral sensor 50 is then coupled to differential sensor 30 via a coupling loop formed by line 120. This circuit will have a total resistance of R11+R4. Furthermore values of R11 and R4 can be selected to simulate a signal to the differential sensor equivalent to a signal that is traditionally used to test the sensitivity of a differential fault sensor. This signal is normally created by coupling for example, a 15K resistor across the line in a method to create a current imbalance to the differential sensor. In other words, the values of R11 and R4 can be selected to provide a similar reading by differential sensor 30 as would be found by a 15K resistor for resistor Ry on line 140 shown in FIG. 1C.

Figure 1B:
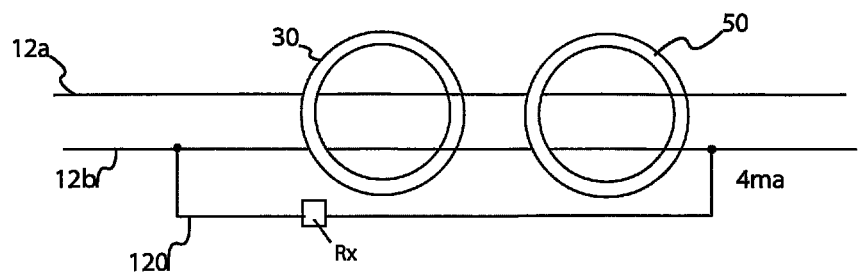
FIG. 1B shows a schematic block diagram of a loop through two sensors.

Once this occurs, as shown in FIG. 1B, the grounded neutral sensor 50 is then coupled to adjacent differential sensor 30 via line 120 passing along the neutral line 12b forming a loop between neutral line 12b which passes through sensors 30 and 50, and is coupled at both ends to line 120. Coupling grounded neutral sensor 50 to differential sensor 30 causes differential sensor 30 to pass a signal on to fault circuit 100 by recognizing the electromagnetic signal from grounded neutral sensor 50.

As shown in FIG. 1B, this coupling between the two sensors is created by a loop passing through the two sensors formed by lines 12b and 120, coupling both the inside and the outside of the sensors together, and thereby allowing an electrical signal to pass from grounded neutral sensor 50 to differential sensor 30. With this design, while any type of current can be passed from a first end to a second end, in at least one embodiment, a 4 ma current is passed from the first end to the second end to couple these two sensors together. In FIG. 1B, a resistor Rx is coupled along line 120 which is representative of a resistor such as resistor R4 and/or R11 (See FIGS. 1A and 4B).

Figure 1C:
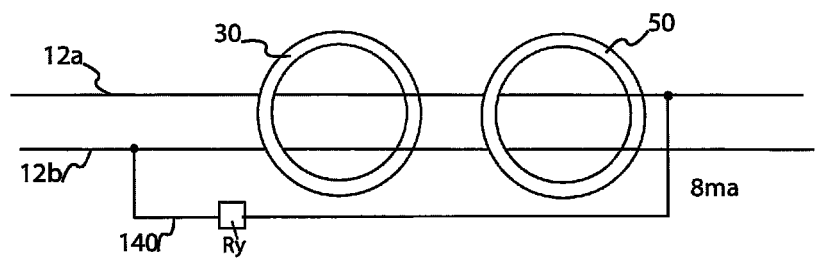
FIG. 1C shows a schematic block diagram of a traditional differential fault circuit through a differential sensor.

FIG. 1C shows another line 140 which is coupled at one end to neutral line 12b and at another end to phase line 12a. This connection is configured to create a current imbalance between phase line 12a and neutral line 12b to allow for the testing of the differential sensor by creating a simulated differential ground fault. In at least one embodiment, Ry is a 15k resistor. With the design of FIG. 1C, the device is configured to trip regardless of the presence of a grounded neutral sensor.

With this design, while any type of current can be passed from a first end to a second end, in at least one embodiment, at least a 8 ma current is passed from phase line to neutral line to create this current imbalance. This is because UL requires a fault test circuit not to exceed 9 ma for testing of a differential sensor 30. In FIG. 1C there is a resistor Ry which is representative of a resistor such as resistor R12 and/or R11 (See FIGS. 2 and 4B)

Figure 1D:
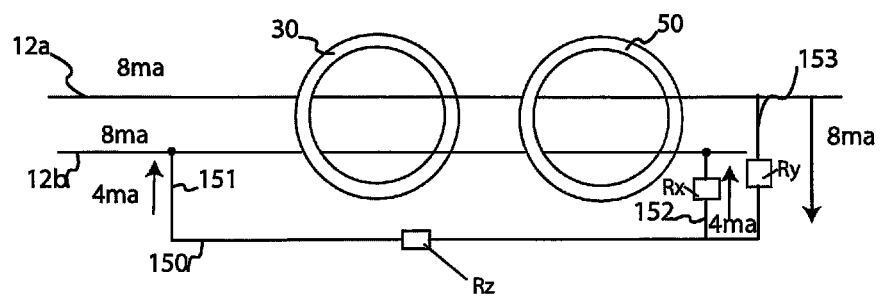
FIG. 1D shows another embodiment combining the configurations of FIG. 1B and FIG. 1C.

FIG. 1D shows both of the connections shown in FIGS. 1B and 1C connected simultaneously. With this design there are lines 150, 151, 152, and 153 which are configured to couple at a first end to neutral line 12b via line 151, a second end to neutral line 12b via line 152, thereby creating the loop indicated in FIG. 1B. In addition, the coupling of line 151, at the first end to neutral line 12b and at the second end to phase line 12a via line 153 allows for the creation of the simulated fault signal as well. FIG. 1D essentially allows for the full testing of the circuit, for both a grounded neutral test, and for a ground fault test to be conducted simultaneously while still only generating a simulated test fault signal not to exceed 9 ma as required by UL. While in this embodiment any type of current can be passed from the first end to the second end, a total of at 8 ma is passed from the first end to the second end. The current flows from one end which is coupled to both the phase line 12a, and at another point to the neutral line 12b to a second end at line 12b via line 151. Essentially, the design of FIG. 1D is a compilation of the currents passed as shown in FIGS. 1B and 1C. In FIG. 1D there are representative resistors Rx, Ry, and Rz however these resistors may have different values than the resistors Rx and Ry of FIGS. 1B and 1C.

Once these two sensors are coupled together, a signal passes from differential sensor 30 on to fault circuit 100 indicating the presence of a fault, which in this case is a grounded neutral fault.

Once fault circuit 100 detects this ground fault or grounded neutral fault, it causes pin 1 of fault circuit 100 to go high, which triggers SCR SC1, resulting in the tripping of an actuator 90 (See FIG. 1A). Actuator 90 is configured to trip or disconnect contacts 60 to cause an electrical disconnect between line side 12 and the other two ends including load side 20 and face side 70. With the present embodiments, while a simulated grounded neutral condition is created on the line side, under many operating conditions, the grounded neutral condition may be created on a load side.

For example, as shown in FIG. 1A, when SCR SC1 is triggered, this causes current to flow through line 91 causing current to flow through coil 92, which causes an associated plunger 95 to spring or trip, which causes activation of the plunger 95.

Figure 2:
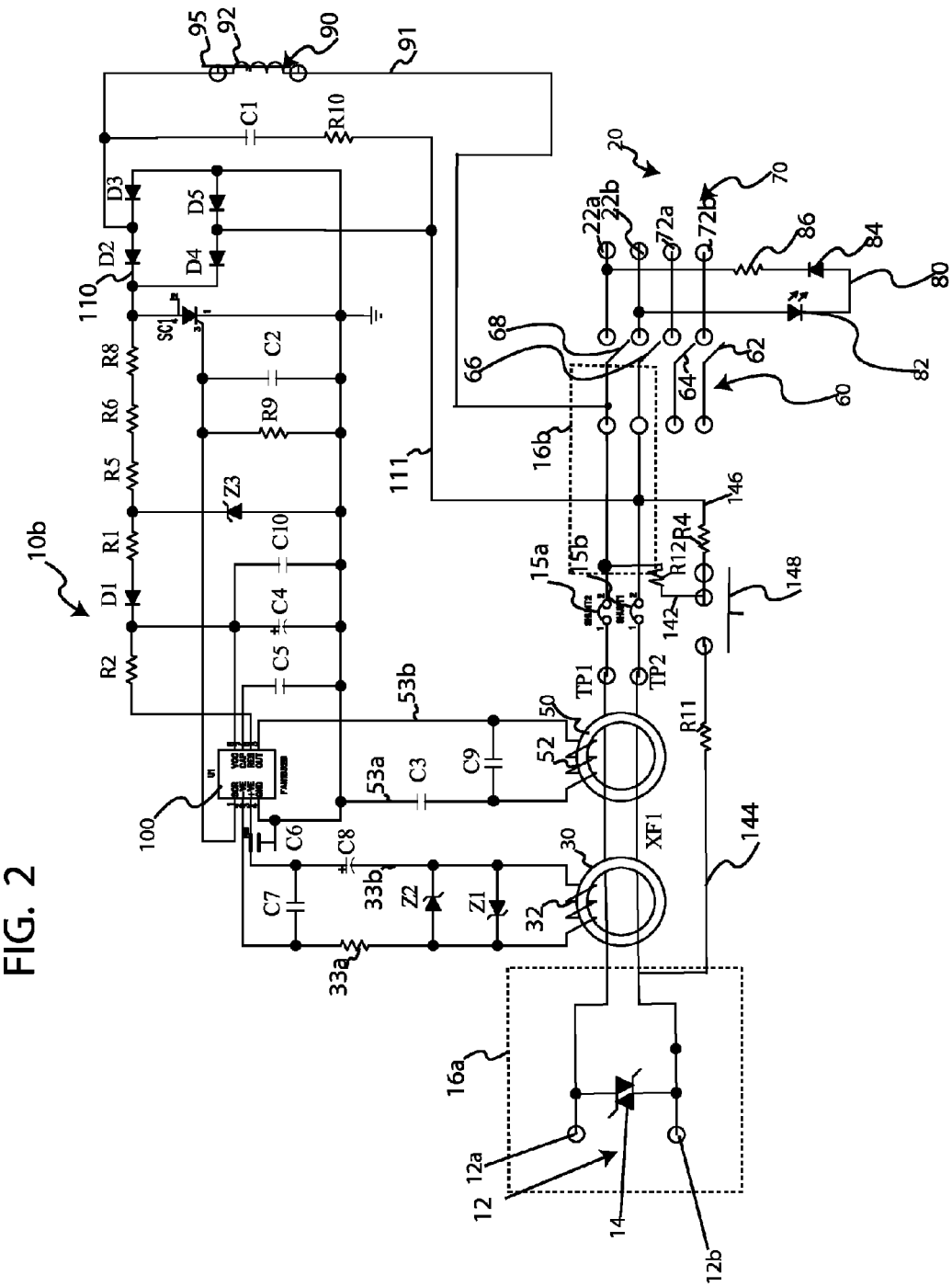
FIG. 2 is a second schematic block diagram of a fault circuit interrupter having a test circuit for grounded neutral testing and ground fault testing.

FIG. 2 discloses an alternative embodiment or design 10b which includes three additional lines 142, 144, and 146 which can all be electrically coupled together via a switch 148. When a user presses a button activating switch 148, this couples lines 142, 144 and 146 together along a common electrical path. Line 142 is coupled at a first end to side phase line 12a, has resistor R12 and extends to switch 148. Line 144 is coupled at a first end to line side neutral line 12b, has resistor R11, and extends to switch 148. With this design there is formed a grounded neutral and ground fault test circuit which comprises at least one of lines 142, 144, 146, resistors R4, R11, and R12 and test switch 148.

Line 146 is coupled to neutral line 12b at a second position within region 16b on line side neutral line 12b on an opposite side of differential sensor 30 and grounded neutral sensor 50 as line 144 and region 16a. The pressing of switch 148 creates two simultaneous test paths for the current, one along lines 142 and 144 creating a simulated ground fault, and another along lines 146 and 144 creating a simulated grounded neutral fault. Selecting the proper values for resistors R11, R12, and R4 makes it possible to generate a current of 8 milliamps of which at least in one embodiment, less than 4 milliamps is detected by the differential sensor.

Figure 3:
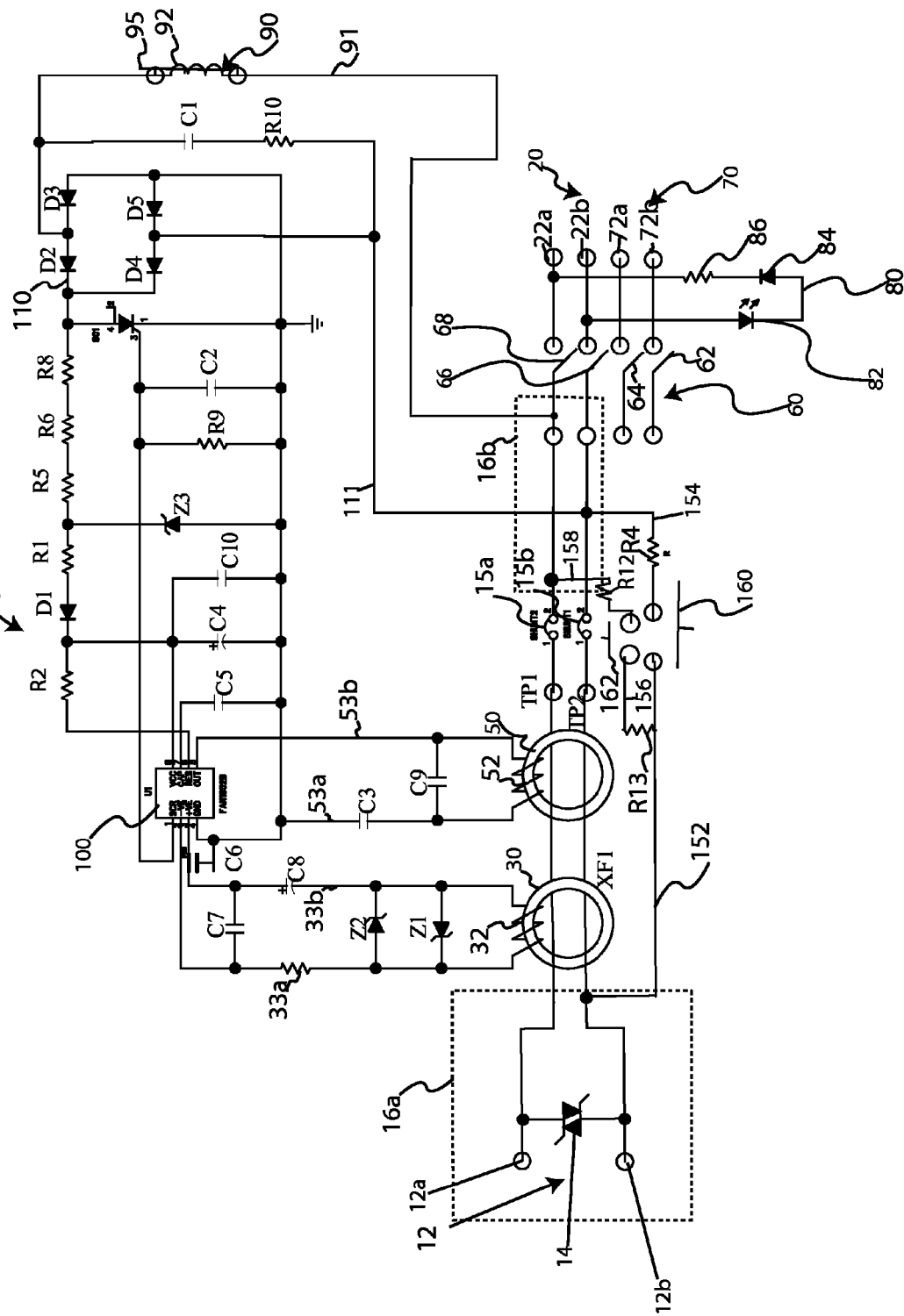
FIG. 3 is a third schematic block diagram of a fault circuit interrupter having a test circuit for grounded neutral testing and ground fault testing.

FIG. 3 discloses a test system design 10c which is configured to create at least one test signal indicating at least one of: 1) a grounded neutral fault; and 2) a ground fault.

While the design can be created in any useful way, FIG. 3 discloses an embodiment wherein there are a plurality of lines 152, 154, 156 and 158. Line 152 is coupled at a first end to line side neutral line 12b and extends to switch 160, while line 154 is coupled to line side neutral line in area 16b at a first end and to switch 160 at the second end. In addition, there is an additional switch 162 which is coupled along lines 154, 156, and 158. For example, line 156 is coupled at a first end to line 152 and at a second end to switch 162. Line 158 is coupled at a first end to line side phase line and at a second end to switch 162.

In one embodiment, switches 160 and 162 can be comprised of separate switches. For example, test switch 160 is configured to test the grounded neutral sensor 50, while test switch 162 is configured to test the differential sensor. In an alternative embodiment, the switches can be combined in a single push button switch (See FIG. 2), wherein when a person pushes down on this single switch, both the differential sensor 30 and the grounded neutral sensor 50 are tested.

Pressing test switch 160 causes current to flow from line side neutral line 12b to test line 152 and around both differential sensor 30 and grounded neutral sensor 50 from region 16a to 16b on neutral line 12b, which creates a loop around both differential sensor 30 and grounded neutral sensor 50. Region 16a is a position on a first side of the sensor where the test line connects. Region 16b is located at a second region on an opposite side of sensors 30 and 50 which forms a region where the test lines connect to power lines. For example, when test switch 160 is pressed, current flows from line 12b, through the closed circuit created by switch 160 contacting line 154, and onto line 154, where it passes through resistor R4. The pressing of switch 160 electrically connecting line 152 to line 154 creates this loop coupling grounded neutral sensor 50 to differential sensor 30. This results in the loop shown by way of example in FIG. 1B, resulting in a signal being passed from grounded neutral sensor 50, to differential sensor 30. Under normal operating conditions, such as with 120 v 60 Hz power input from powerline wiring, this causes differential sensor 30 to pass a signal onto fault circuit 100. Fault circuit 100 creates a fault signal which passes from processor 100 to SCR SC1, actuating SCR SC1, causing power to flow through actuator 90, thereby resulting in actuation of actuator 90 as described above.

In addition, when switch 162 is pressed, a differential test is conducted and power flows from line side phase line 12a, through line 158, through switch 162 and to lines 156 and 152. This pressing of switch 162 creates a current imbalance between the phase line and the neutral line which simulates a ground fault. Differential sensor 30 is configured to detect this current imbalance, whereby a signal is passed from differential sensor 30 and to processor 100 in a known manner. Under normal operating conditions (120 v 60 Hz) as described above, this creates a sufficient current imbalance to create a sufficient current signal from differential sensor 30 into processor 100 to cause processor 100 to send a trip signal or fault signal onto SCR SC1, thereby actuating SCR SC1 to cause power to flow through actuator 90. In this embodiment, a grounded neutral test circuit is formed by at least one of lines 152, and 154, test switch 160, and resistor R4. A ground fault test circuit is formed by at least one of lines 156 and 158, resistors R13, and R12, and test switch 162.

The use of any one of these switches in FIGS. 1-3 such as switches 130, 148, 160 or 162 can be used both as an initial test when the device is operational or in a reset-lockout manner as taught by U.S. Pat. No. 6,864,766 to Disalvo which issued on Mar. 8, 2005, wherein this disclosure of that patent is hereby incorporated herein by reference.

Under a reset lockout condition, the device is shipped in a tripped condition, wherein for that device to be operational, and for the contacts such as contacts 60 including contacts 62, 64, 66, and 68, to be closed, the device must be tested. This testing causes actuator 90 to actuate, causing a plunger such as plunger 95 to be actuated inside of solenoid 92 thereby allowing contacts 60 to move into a latched position.

Therefore, the designs 10a-10g as shown in FIGS. 1A, 2-4D show alternative designs which are each configured to be implemented or installed into a single gang electrical enclosure such as housing 300 (See FIGS. 5A, 5B) which is configured to house any one of designs 10a-10g. Housing 300 which houses any one of designs 10a-10g is configured to be installed into a wall box forming an in line mounted fault circuit.

Figure 4A:
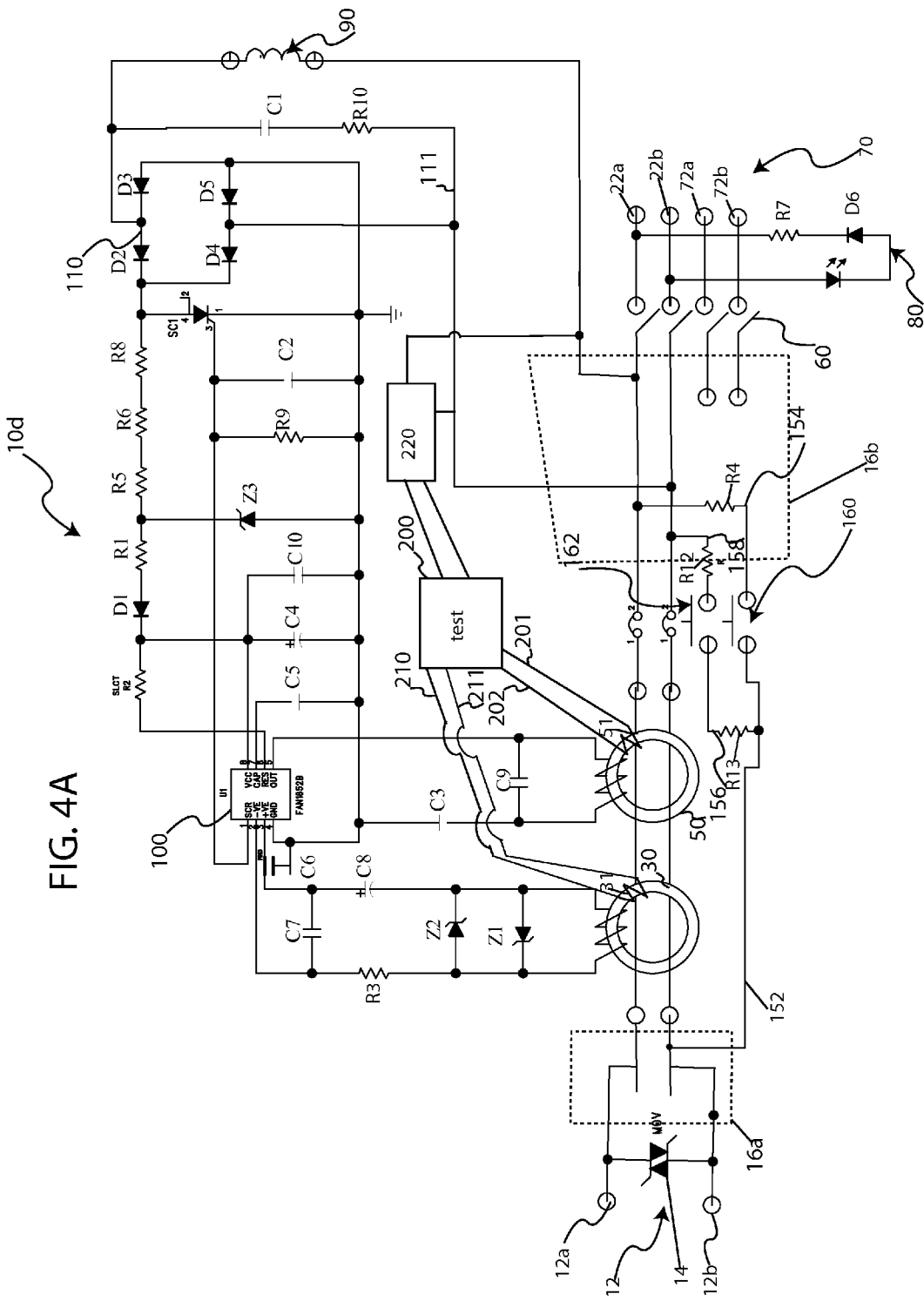
FIG. 4A is a fourth schematic block diagram of a fault circuit interrupter having a test circuit for grounded neutral testing, ground fault testing and a test circuit comprising a processor.

FIG. 4A is a first embodiment of a self-testing type device which includes a processor 200 which can be in the form of a microcontroller or microprocessor. This processor 200 is coupled to power supply 220 and is configured to test differential sensor 30 and grounded neutral transformer 50. Lines 210 and 211 are coupled to differential sensor 30 and are configured to form a coil 31 for differential sensor for testing differential sensor 30. In addition, lines 201 and 202 which are coupled to processor 200 are coupled to grounded neutral sensor 50 to form a coil 51. These coils can be used to test the sensors individually. (See FIG. 4B) Additional circuitry can also be coupled to processor 200. For example, there can be an indication circuit 215 which can comprise any one of a light or an audible indicator or both. There can also be a wireless communications circuit 240 coupled to processor to provide wireless communication to remote devices, this communication can be in the form of receiving a test request, or communicating the results of a test. There is also zero crossing circuitry 230 which can be configured for timing purposes. In addition, there is wired communication circuit 255 which is configured to send the information through a wired transmission such as through a power line. Each of these additional circuits 215, 230, 240, and 255 are optional circuits which can be added to any one of the configurations disclosed herein. With this design, a grounded neutral test circuit can comprise at least one of coil 51, lines 152, 156, and 158, resistor R13, and resistor R12 switch 160, and test controller or processor 200. A ground fault test circuit can comprise at least one of line 152, line 154, resistor R4, coil 31, and processor 200.

Figure 4B:
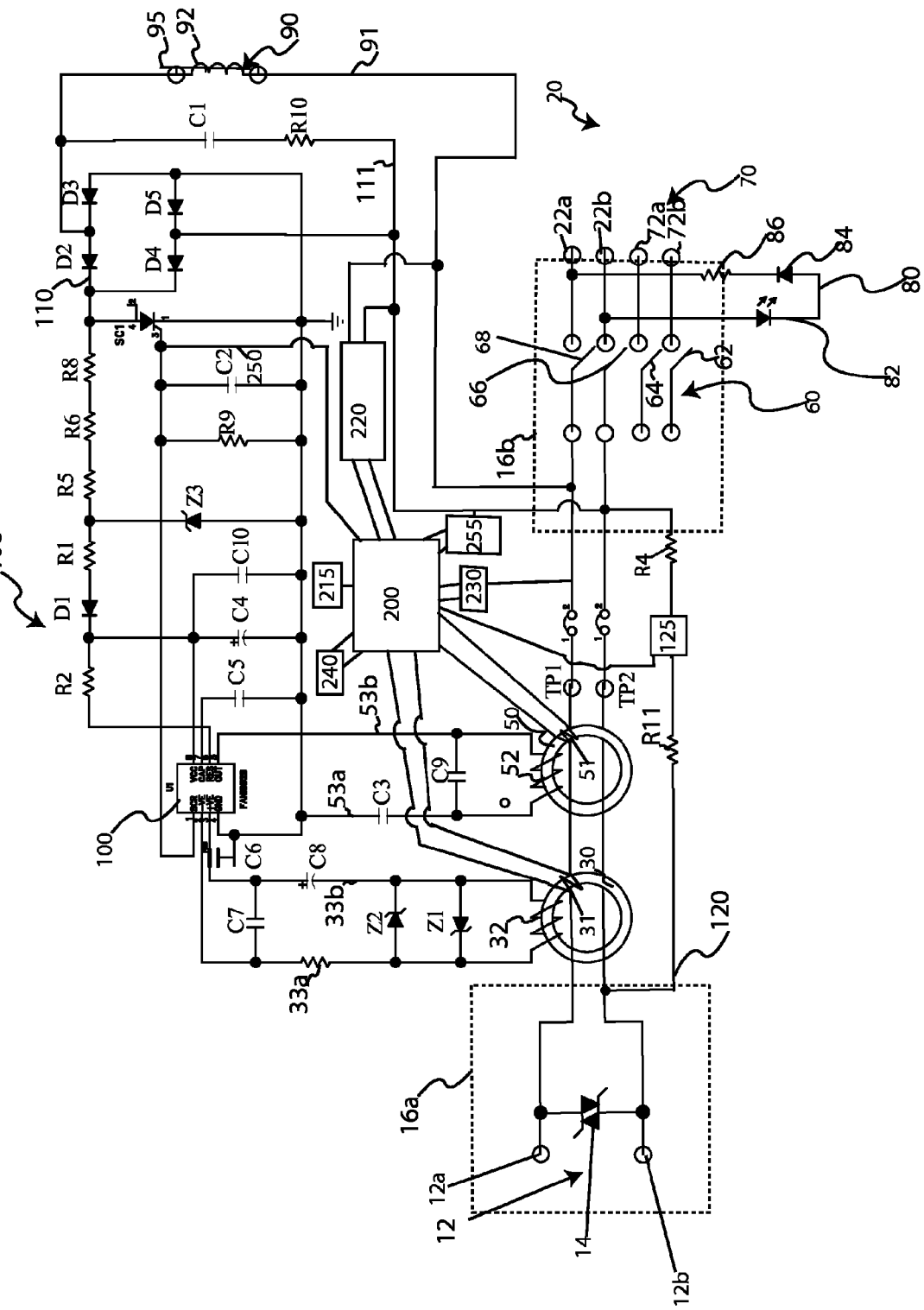
FIG. 4B is another schematic block diagram of a fault circuit interrupter having another type of test circuit.

FIG. 4B shows another alternative design which includes a test circuit comprising a processor 200 which in at least one embodiment, comprises at least one of a microprocessor, or a microcontroller. Microprocessor or microcontroller is hereinafter referred to as processor 200. Processor 200 is powered by power supply 220 which is coupled across both line side phase line 12a and line side neutral line 12b. Processor 200 is powered on when a powerline, such as in the form of premise wires, is coupled to line side 12. For example, a line side hot line can be coupled to line side line 12a, while a line side neutral line can be coupled to line side neutral line 12b. This coupling can be in any known manner such as by screwing or clamping these wires down.

Once power is applied to these lines, this power supplies power supply 220 which then powers processor 200. Power supply 220 can be in the form of any suitable power supply such as in the form of a bridge or voltage regulating device which is used to allow a rapid powering on of processor 200. Processor 200 is configured to have at least one internal timer, and test circuitry, which is configured to send a test signal, and also analytical circuitry which is configured to read whether the test was successful. For example, for purposes of timing the process, processor 200 can have an internal clock which is started either at powering on of the processor, or shortly thereafter. This clock can be solely based upon internal timing, or be synchronized based upon an input relating to zero crossing circuitry 230.

Once the clock counts down after a predetermined period of time, such as after 5 minutes, processor 200 signals the test circuitry to initiate a signal through test circuit 125 which is configured to test a grounded neutral test circuit alone. Test circuitry 125 can be in the form of any circuitry known in the art to form a suitable switching mechanism to selectively allow current to pass from one side of the circuitry to the other. This type of circuitry is selected from the group comprising solid state circuitry, any type of transistor, SCR or any other known circuitry suitable for this purpose. This circuitry is configured to selectively switch the circuit to allow current to pass from side or region 16a, past differential sensor 30 and grounded neutral sensor 50 and on to side or region 16b. With this design, a grounded neutral test circuit can comprise at least one of line 120, resistors R11, and R4, as well as switch 125, and/or coil 51 and microcontroller 200. In this embodiment, at least two different grounded neutral test circuits are formed. A first grounded neutral test circuit can comprise at least one of processor 200 and coil 51. A second grounded neutral test circuit can comprise at least one of line 120, resistor R11, switch 125, resistor R4, and processor 200.

Figure 4C:
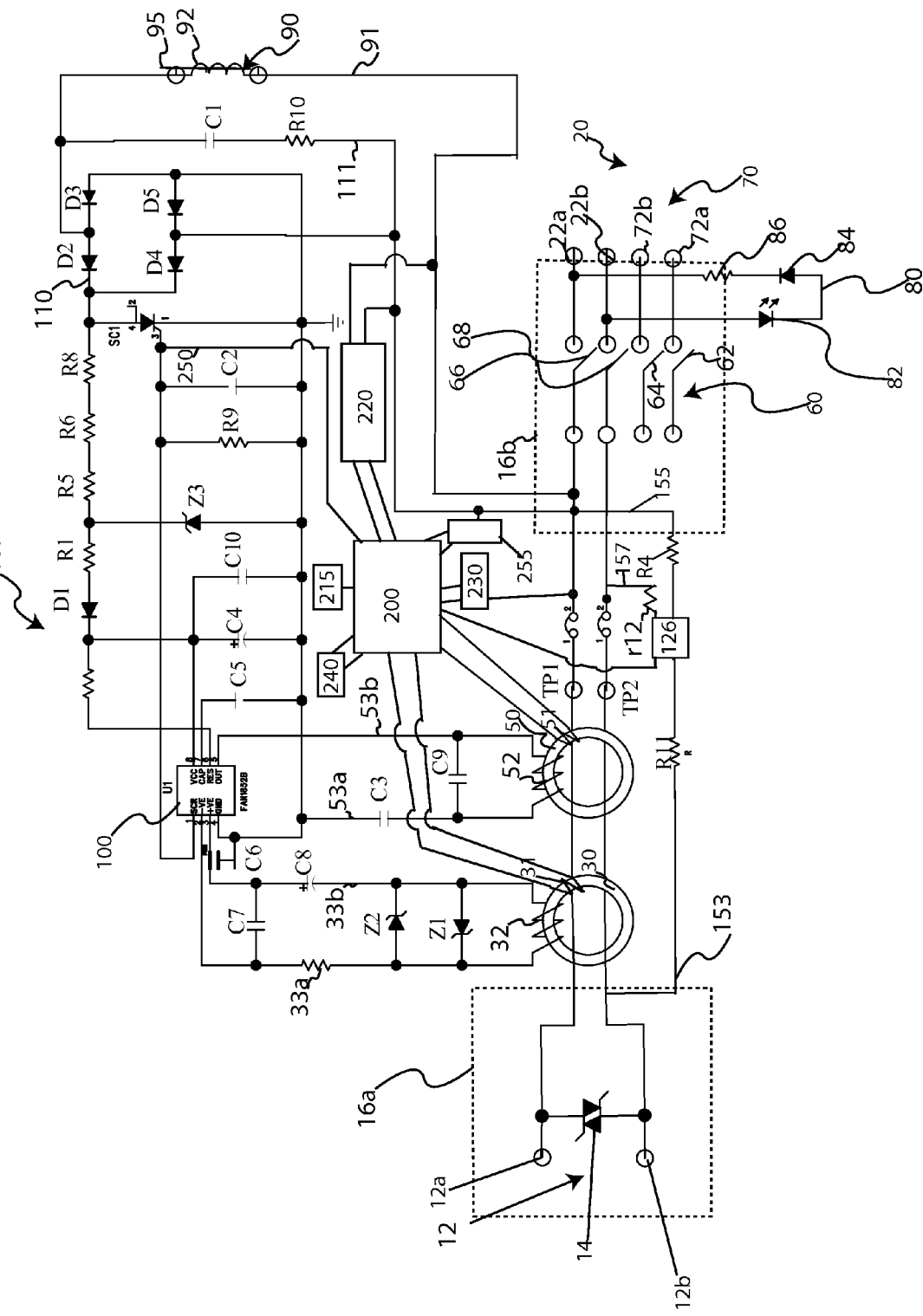
FIG. 4C is another schematic block diagram of a fault circuit interrupter having another type of test circuit.

FIG. 4C shows another embodiment which shows a test switch 126 which operates in a similar manner. Test switch 126 is configured to provide a simultaneous testing for ground fault and grounded neutral fault. Test switch 126 can comprise any one of solid state circuitry, a SCR, or any other type circuitry known in the art which is configured to be activated by processor 200. When test switch 126 is activated, it allows current to flow across it to create a current imbalance as well as form a loop coupling grounded neutral transformer 50 with differential transformer 30 in a manner similar to that shown in FIG. 2. Thus, the activation of test switch 126 allows current to flow from line 153 to line 155, and current to flow from line 153 to line 157, thereby forming a simultaneous ground fault test and grounded neutral test. With this design, there are at least two grounded neutral test circuits with at least one grounded neutral test circuit being formed by processor 200 and coil 51, and another grounded neutral test circuit comprising at least one of line 153, switch 126, line 157, resistors R11 and R2, and processor 200.

In addition, with this design, there are at least two different ground fault test circuits formed, with at least a first comprising at least one of processor 200 and coil 31. A second ground fault test circuit can be formed by at least one of line 153, and line 155, as well as resistors R11, and R4, switch 126, and processor 200.

Figure 4D:
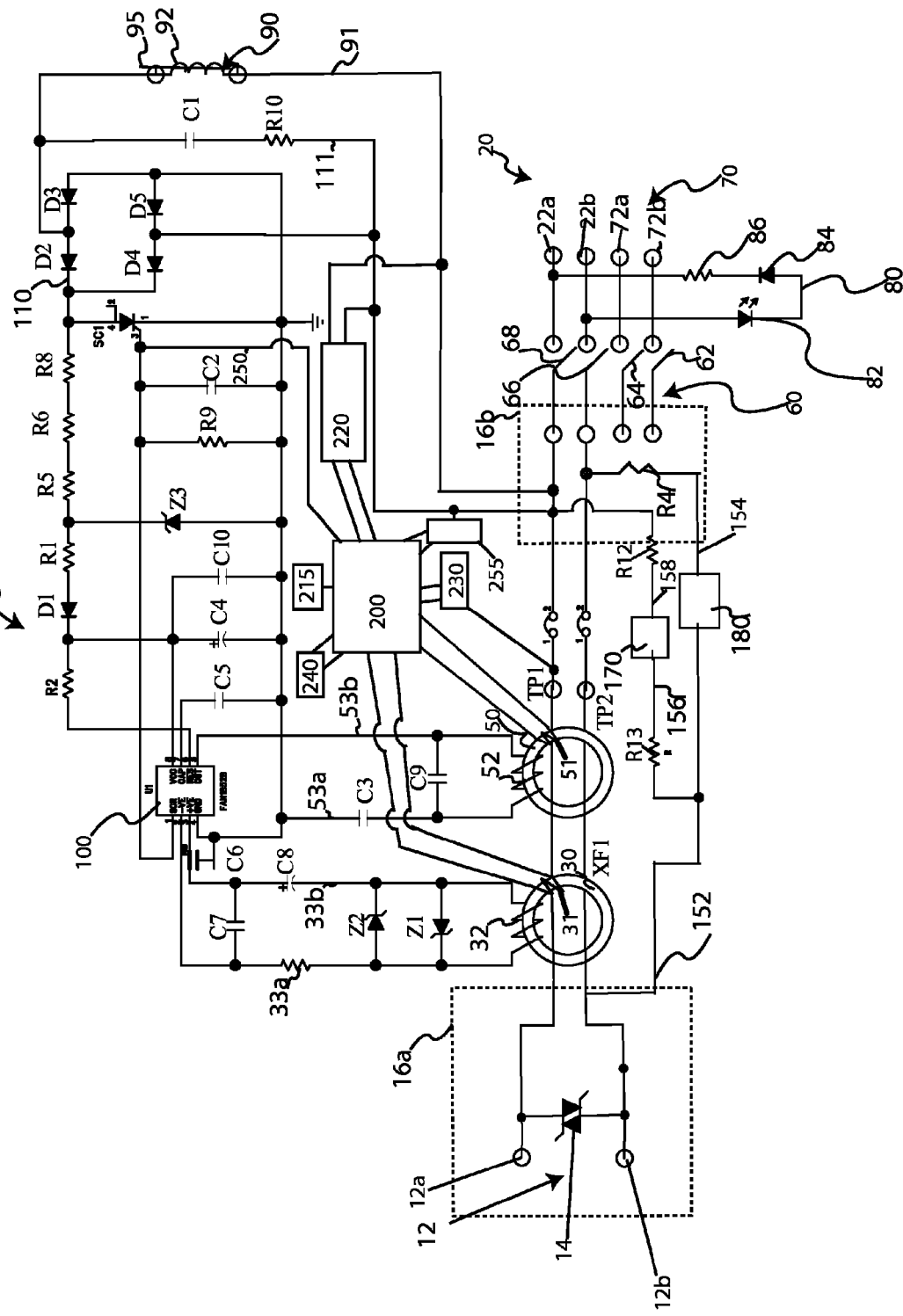
FIG. 4D is another schematic block diagram of a fault circuit interrupter having another type of test circuit.

FIG. 4D is another embodiment which shows test circuits 170 and 180 which can be individually activated by processor 200 to allow current to flow across these circuits. The two different test circuits 170 and 180 allow for both testing for a ground fault or a grounded neutral fault.

Test circuits 170 and 180 can be any type of test circuit selected from the group comprising solid state circuitry, any type of transistor, SCR, or any other known circuitry suitable for this purpose.

For example, if processor 200 initiates a first test, through test circuit 170 which forms a grounded neutral test switch, this creates an electrical loop as shown for example in FIG. 1B which creates a closed loop around differential sensor 30 and grounded neutral sensor 50. As stated above, this closed loop creates a simulated fault which results in the passing of a signal from grounded neutral sensor 50, on to differential sensor 30. Differential sensor 30 then passes a signal into fault circuit 100. Since the self-test is configured to generate a signal sufficient to trigger a disconnect signal from fault circuit 100, this signal passes into fault circuit 100 and is then sent from pin 1 of fault circuit 100 to SCR SC1. This same signal is then sent into processor 200 via line 250 which allows processor 200 to confirm that a successful self-test has been completed. In a preferred embodiment, if processor 200 shunts a signal along line 250 then SCR SC1 would not activate, and the contacts 60 would not trip during the processor induced self-test. If the test signal is received within processor 200 within a predetermined period of time, then it results in an indication of a successful self-test. If the signal is not received within this period of time, then it indicates an unsuccessful self-test. Processor 200 can then provide indication of this unsuccessful self-test by either indicating an indication circuit 215, or sending a signal through a communication circuit such as communication circuits 240 or 255 to a remote device to indicate a failed self-test. Indication circuit 215 can be in the form of a plurality of lights with at least one light indicating a failed self-test. Indication circuit 215 can also be in the form of an audible indicator such as a buzzer which indicates whether a self-test has been successful. With the design of FIG. 4D, at least one grounded neutral test circuit comprises at least one of processor 200, and coil 51, while at least another grounded neutral circuit comprises at least one of processor 200, lines 152, 156, 158, resistors R12, and R13, and switch 170. At least one ground fault test circuit comprises at least one of processor 200, and coil 31.

If the self-test has been unsuccessful, depending on the use of the fault circuit, processor 200 can then initiate a trip signal to trip contacts 60 to remove power from load 70.

Processor 200, can also, either before, during, or after the above test, conduct a test on differential sensor 30. For example, a test signal can be passed into test circuit 180 which allows power to flow from region 16a to 16b along line 158 thereby creating a current imbalance between phase line 12a and neutral line 12b. This current imbalance results in a simulated fault signal being created by differential sensor 30 which results in a signal being input into fault circuit 100.

Processor 200 would react in a similar manner as indicated above, wherein a successful self-test would result in a trip signal being passed to processor 200 within a predetermined period of time, or an unsuccessful self-test resulting in little or no signal being passed to processor 200 within the predetermined period of time, resulting in an indication of a failed self-test.

In an alternative manner, processor 200 could be used to apply a test signal to sensors 30 and 50 through the addition of additional windings placed on sensors 30 and 50. For example, windings 31 coupled to differential sensor 30 would allow processor 200 to conduct a direct test on the viability of sensor 30. In addition, windings 51 coupled to grounded neutral sensor would allow processor 200 to directly test this sensor as well by selectively applying a signal to this sensor.

To self-test the circuitry including conducting both a grounded neutral test and a ground fault test without tripping the contacts, processor 200 can, in at least one embodiment, be configured to shunt the signal from fault circuit 100 into SCR SC1. This shunting would occur via line 250 which shunts the signal into processor 200 in a known manner, and thereby prevents the signal from passing from fault circuit 100 into SCR SC1.

Figure 5A:
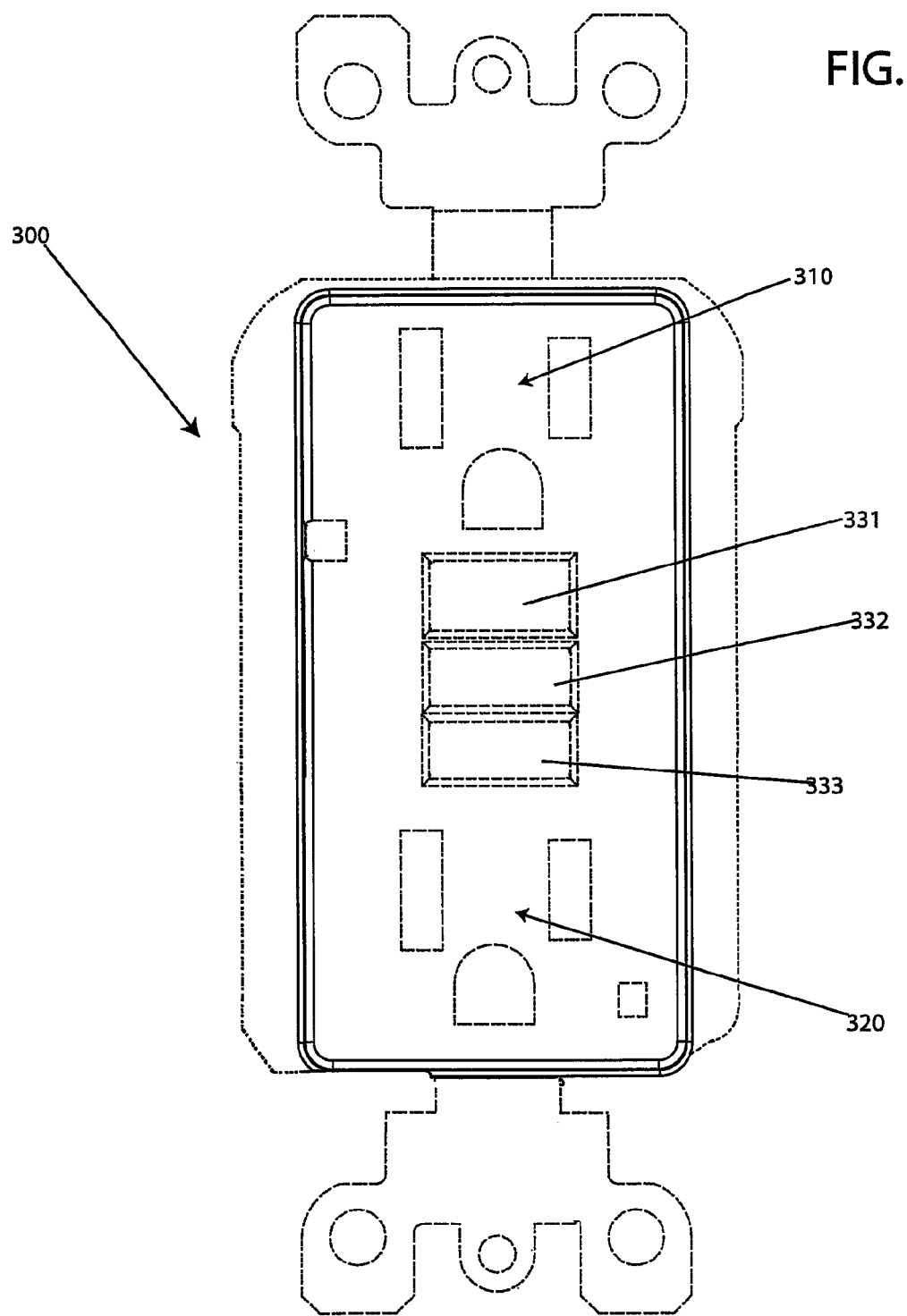
FIG. 5A illustrates an outside body of a single gang enclosure having buttons for initiating the self-test.

FIG. 5A is a perspective view of a housing 300 which includes a plurality of face contacts or openings 310 and 320, and a plurality of buttons such as buttons 331, 332, and 333. Housing 300 shows face contacts or openings 310 and 320 which are configured to receive a plug in dash dotted lines because these face openings are optional and can instead comprise any one of: a light, an occupancy sensor, a switch, or any other device known in the art. Buttons 331, 332 and 333 are buttons that can be used to test the opening of contacts 60, or conduct a particular test such as a grounded neutral test or a ground fault test and then reset the contacts in a known manner. For example, first button 331 can be a "Test Button" configured to simply open contacts 60 when pressed. Pressing the first button 331 would unlatch contacts so that they snap open and remain open until reset. Second button 332 can be configured to couple to any one of switches 130, 148, or 160 to perform at least a manual grounded neutral test. In the case of switch 148, when second button 332 is pressed, it performs both a grounded neutral test and a ground fault test.

Third button 333 can be configured to be coupled to switch 162 so that when button 333 is pressed it performs a ground fault test separate from a grounded neutral test described above.

In at least one embodiment, button 332 can be configured to only couple to either switches 130, 148 and 160 so that it only performs a grounded neutral test. Alternatively, button 332 can be coupled to a plunger which is also configured to relatch contacts 60 in a known manner to close contacts 60 after a successful self-test.

In addition, button 333 can be configured, in at least one embodiment, to only couple to test switch 162, or to also be configured in a reset-lockout manner such that the pressing of this test switch 162 results in the relatching of these contacts as well.

Figure 5B:
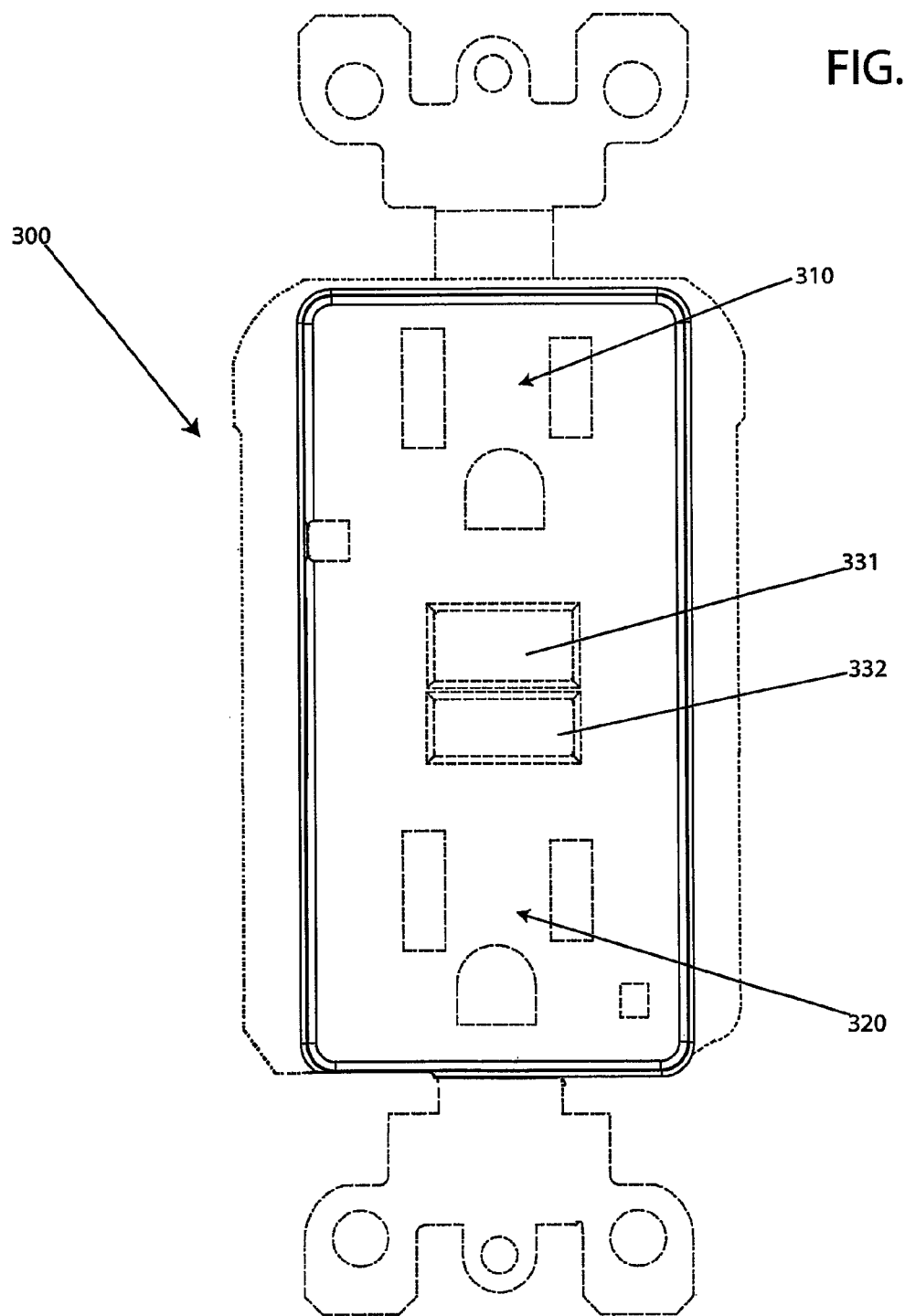
FIG. 5B illustrates another embodiment of an outside body of a single gang enclosure for initiating a test

FIG. 5B shows an alternative embodiment wherein there are only two test buttons 331 and 332. With this design, there is a test button which releases contacts such as contacts 60 and a reset button which also conducts a test of the circuitry and also a reset of the circuitry. This button such as button 332, can be configured to activate a single test switch such as test switch 148 such that test switch 148 is manually actuatable. The housing of the above two embodiments shown in FIGS. 5A and 5B, are configured to be installed into a wallbox such as a single gang electrical enclosure. A single gang electrical enclosure can have a predetermined size and set of dimensions as are known in the art.

Figure 6A:
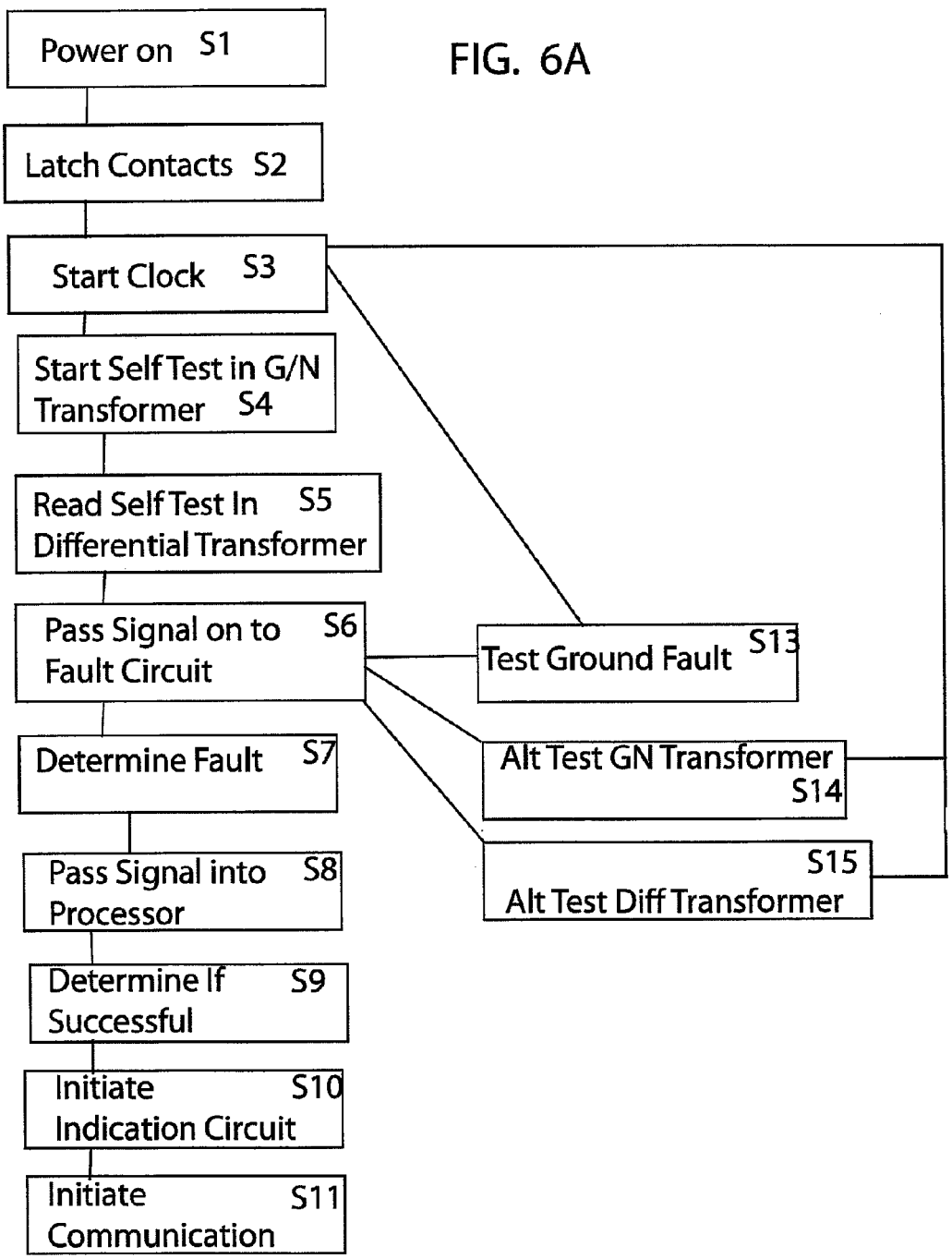
FIG. 6A is a flow chart for the process for one of the devices shown in FIGS. 4A-4D.

FIG. 6A is a flow chart showing the process for self-testing the fault circuit shown in FIGS. 4A-4D. For example, with this design, there is shown a first step S1 which includes powering on the device which is performed by coupling premise wiring to the device such as to line side contacts 12a and 12b. Once the device is powered on, in step S2, contacts 60 are latched so as to allow power to pass from the line side 12 to the load side 70. This latching of the contacts can occur with the pressing of a button such as button 332. Step S2 is optional because this step is not necessary to test the circuitry such as processor 200, differential sensor 30, grounded neutral sensor 50 or fault circuit 100.

In step S3, processor 200 starts a clock which is a timer clock to count down to the self-test. This timer clock could be set based upon the start time or based upon another reference point such as a zero crossing point in a line signal. Next, in step S3 the timer clock counts to zero or counts the number of zero crossing signals to determine a particular period of time and then initiates a self-test. The self-test could include a first test in step S4 which tests processor 200, differential sensor 30, and fault circuit 100. The signal generated by processor 200 passes through any one of test circuits 125, 126, 170 and 180 (See FIGS. 4B-D) which creates a signal passing from region 16a to region 16b on neutral line 12b thereby creating a signal loop as shown schematically in FIG. 1B. This creates a simulated grounded neutral fault which is then read by differential sensor 30 in step S5. Differential sensor 30 then passes a signal onto fault circuit 100 in step S6. Next, in step S7 fault circuit 100 determines that a fault (either simulated or actual) has occurred and initiates a trip signal. In optional step S8, (See FIG. 6B) processor 200 can shunt this trip signal through line 250 to prevent SCR SC1 from being activated thereby triggering coil 90 to open contacts 60.

This trip signal is then passed into processor 200 in step S9. Step S10 involves determining if the self-test was successful. If the signal passes into processor 200 within the predetermined period of time, then the self-test is successful. If this signal does not pass into processor 200, then this self-test is unsuccessful. In step S11, processor 200 initiates either indication circuit 215 to indicate a failed self-test or initiates a communication through communication circuit 255 to indicate a failed self-test to a remote device in step S12.

Similarly, processor 200 can initiate a test on test circuit 180 (See FIG. 4D) in step S13 whereby this step creates a current imbalance between the phase line 12a and neutral line 12b thereby creating a simulated fault circuit. The process would repeat through steps S6-S11 or S12 to provide indication of a successful or a failed self-test.

Alternatively, sensors 30 and 50 can be individually tested via additional windings 31 and 51 which allow for alternative testing of the circuit. For example, in step S14 processor 200 could initiate a self-test on winding 51 by sending a signal through coil or winding 51 simulating the existence of a grounded neutral fault. This signal could be a high frequency signal passed from test circuit 200 to grounded neutral sensor 50 creating a high frequency signal to be read by differential sensor 30. This process would then proceed through steps S6-S11 thereby resulting in an alternative self-test of the device.

Alternatively, processor 200 can initiate a test on differential sensor 30 by sending a signal through coil or winding 31 creating the indication of a fault occurring in the circuit in step S14. This signal would then result in a signal being passed into processor 100. Thus the process would then proceed through steps S6-S12 resulting in the testing of differential sensor S30.

Figure 6B:
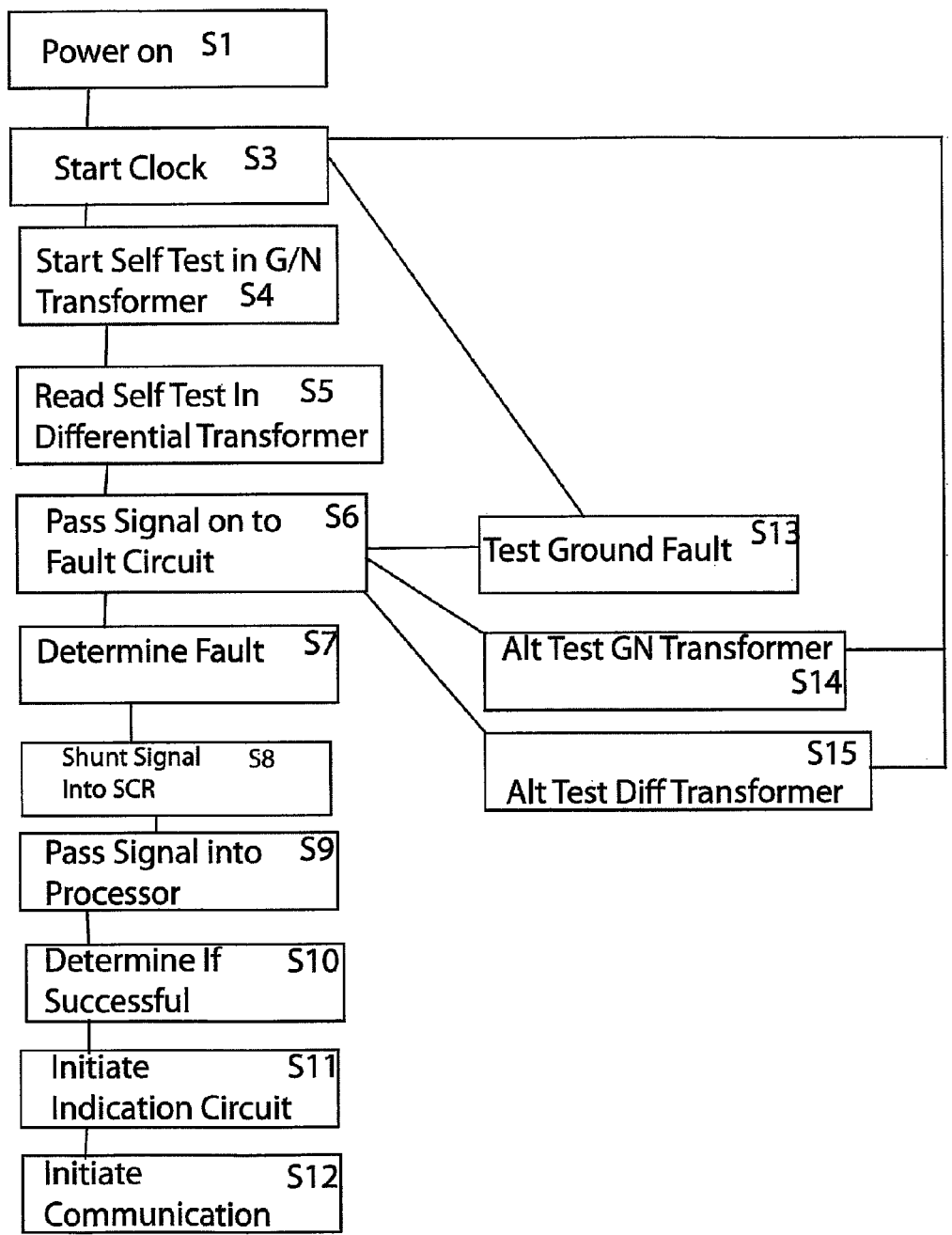
FIG. 6B is another flow chart for the process for one of the devices shown in FIGS. 4A-4D.

FIG. 6B is a similar process, however, this process does not include the step S2 for latching the contacts. The process in step 6A being a reset lockout type system which involves automatic grounded neutral testing once the contacts are latched. In addition there can also be automatic ground fault testing as well such as with the designs shown in FIGS. 2, 3, 4A, 4C, and 4D. This process also includes step S8 which includes shunting the signal to prevent it from reaching the SCR during a self-test which prevents actuator 90 from activating preventing plunger 95 from firing.

Accordingly, while a few embodiments of the present invention have been shown and described, it is to be understood that many changes and modifications may be made thereunto without departing from the spirit and scope of the invention as defined in the appended claims.

What is claimed is:

1. A fault circuit interrupter comprising:
   a phase path;
   a neutral path;
   a grounded neutral transformer;
   a differential sensor; and
   a test circuit;
   wherein said test circuit is coupled to said neutral path on one side of said grounded neutral transformer and said differential sensor, and wherein said test circuit is further coupled to said phase path and said neutral path on another side of said grounded neutral transformer and said differential sensor.

2. The fault circuit interrupter as in claim 1, further comprising at least one fault circuit which is configured to detect a signal sent from said grounded neutral transformer.

3. The fault circuit interrupter as in claim 1, further comprising a line side and a load side and a plurality of separable contacts, wherein said line side and said load side are separated by said plurality of separable contacts.

4. The fault circuit interrupter as in claim 1, wherein said test circuit comprises a test line comprising a resistor.

5. The fault circuit as in claim 1, wherein said test circuit is taken from the group consisting of a mechanical switch, an electrical switch, solid state circuitry, a transistor, a silicon controlled rectifier.

6. The fault circuit as in claim 1, further comprising at least one indicator device comprising an indication circuit.

7. The fault circuit as in claim 6, wherein said at least one indication circuit comprises at least one of a light and an audible indicator and wherein said at least one indication circuit is configured to indicate at least one of the following conditions: a failed self-test, a successful self-test, and whether the contacts are latched.

8. The fault circuit as in claim 1 further comprising a first switch configured to directly test said grounded neutral transformer.

9. The fault circuit as in claim 8, further comprising a second switch configured to directly test said differential sensor.

10. The fault circuit as in claim 1, wherein said test circuit is a self-test circuit.

11. The fault circuit as in claim 10, further comprising at least one processor having at least one timer, wherein said at least one timer is configured to periodically initiate a self-test on said test circuit.

12. The fault circuit as in claim 11, further comprising at least one zero crossing circuit, wherein said zero crossing circuit is configured to determine a zero crossing of a signal on a line, and wherein said at least one clock on said at least one processor is set based upon the zero crossing signal.

13. The fault circuit as in claim 11, further comprising at least one indicator device comprising at least one of an indicator circuit or a communication circuit, said communication circuit in communication with said at least one processor, said communication circuit configured to communicate a condition of the fault circuit to a remote device.

14. The fault circuit as in claim 1, further comprising a second test circuit, wherein said second test circuit is configured to test a differential sensor coil directly.

15. The fault circuit as in claim 1, further comprising a second test circuit, wherein said grounded neutral transformer has a coil, and said second test circuit is configured to test said grounded neutral transformer coil directly.

16. The fault circuit as in claim 1, wherein said one side of said grounded neutral transformer and said differential sensor is a first side and said another side of said grounded neutral transformer and said differential sensor is a second side.

17. The fault circuit as in claim 16, wherein said first side of said grounded neutral transformer and said differential sensor is between said differential sensor and a power input of said phase path and said neutral path.

18. A process for testing a fault circuit of a fault circuit interrupter having a line side and a load side, the process comprising the following steps:
   a) creating a simulated grounded neutral fault on one side of the fault circuit interrupter;
   b) testing whether said simulated grounded neutral fault is correctly detected;
   c) indicating a result of the test to a user; and d) starting a first timer to determine when to initiate the self-test and starting a second timer to determine whether the self-test is successful.

19. The process as in claim 18, wherein said step of testing includes manually initiating a self-test on a grounded neutral transformer and said differential sensor.

20. The fault circuit as in claim 19, wherein said step of testing includes manually initiating a self-test on said grounded neutral transformer and said differential sensor substantially simultaneously.

21. The process as in claim 18, further comprising the step of initiating a communication to a remote device to indicate whether the self-test was successful.

22. The process as in claim 18, further comprising the steps of creating a simulated ground fault, and determining whether said simulated ground fault is detected.

23. A fault circuit interrupter comprising:
   a) a line side having a phase path and a neutral path;
   b) a load side having a phase path and a neutral path;
   c) a grounded neutral transformer;;
   d) a differential sensor;; and
   e) a test circuit;
   f) at least one test switch configured to test both said grounded neutral transformer and said differential sensor; and
   g) wherein said test circuit is coupled to said phase path and said neutral path on one of said line side and said load side of said grounded neutral transformer and said differential sensor, and wherein said test circuit is further coupled to said neutral path on the other of said line side and said load side of said grounded neutral transformer and said differential sensor.

24. The fault circuit interrupter of claim 23 further comprising a plurality of separable contacts, capable of making and breaking electrical continuity between said line side and said load side;
   wherein the test circuit is configured to cause the grounded neutral transformer to output a first electrical signal, and create a second electrical signal indicative of a current imbalance;
   said differential sensor is configured to produce a third electrical signal in response to the first and second electrical signals;
   said fault circuit interrupter is configured to separate said contacts when the third electrical signal is above a predetermined threshold;
   said third electrical signal above a predetermined threshold only if:
   a) both first and second electrical signals are present, or
   b) there is an electrical fault on the load side external to the fault circuit interrupter.

25. ; The fault circuit interrupter of claim 23 wherein said test circuit is a self-test circuit.

26. The fault circuit as in claim 23, wherein said test switch is configured to test both said grounded neutral transformer and said differential sensor substantially simultaneously.

27. The fault circuit as in claim 23, wherein said one side of said grounded neutral transformer and said differential sensor is a second side and said another side of said grounded neutral transformer and said differential sensor is a first side.

28. The fault circuit as in claim 27, wherein said first side of said grounded neutral transformer and said differential sensor is between said differential sensor and a power input of said phase path and said neutral path.

* * * * *